(12) United States Patent
Toebes et al.

(10) Patent No.: US 7,196,805 B1
(45) Date of Patent: Mar. 27, 2007

(54) CONSUMER LEVEL DEVICE FOR AUTOMATICALLY TRANSFERRING DIGITAL IMAGES TO AN INTERNET-BASED SERVICE PROVIDER

(75) Inventors: John A Toebes, Cary, NC (US); Philip R Graham, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 918 days.

(21) Appl. No.: 09/781,531

(22) Filed: Feb. 8, 2001

(51) Int. Cl.
*G06K 1/00* (2006.01)
*G06F 3/00* (2006.01)
*G06F 7/00* (2006.01)
*H04N 5/76* (2006.01)

(52) U.S. Cl. .................... 358/1.15; 358/1.16; 710/33; 348/231.6; 348/211.1; 348/211.6; 707/1

(58) Field of Classification Search .............. 358/1.15, 358/1.16; 348/211.1, 207.1, 211.6, 552, 348/231.6; 710/33; 707/1, 10, 9; 709/218, 709/219, 227, 246; 705/44
See application file for complete search history.

(56) References Cited

U.S. PATENT DOCUMENTS

| | | | |
|---|---|---|---|
| 6,301,223 B1* | 10/2001 | Hrastar et al. ............. | 370/227 |
| 6,529,236 B1 | 3/2003 | Watanabe | |
| 6,535,228 B1* | 3/2003 | Bandaru et al. ............. | 715/752 |
| 6,657,660 B2 | 12/2003 | Shiota et al. | |
| 6,707,573 B1* | 3/2004 | Ito et al. ..................... | 358/1.9 |
| 6,710,801 B1 | 3/2004 | Kubo | |
| 6,715,003 B1* | 3/2004 | Safai ......................... | 710/33 |
| 6,721,002 B1 | 4/2004 | Dotsubo et al. | |
| 6,724,416 B1 | 4/2004 | Liu | |
| 6,724,502 B1 | 4/2004 | Miyake et al. | |
| 6,750,902 B1* | 6/2004 | Steinberg et al. ......... | 348/211.3 |
| 6,750,905 B1 | 6/2004 | Iwami et al. | |
| 2001/0042045 A1* | 11/2001 | Howard et al. ............. | 705/51 |
| 2002/0054224 A1* | 5/2002 | Wasula et al. ............. | 348/232 |
| 2004/0085576 A1* | 5/2004 | Paz-Pujalt et al. ......... | 358/1.15 |

\* cited by examiner

*Primary Examiner*—King Y. Poon
*Assistant Examiner*—Thomas J. Lett
(74) *Attorney, Agent, or Firm*—Baker Botts L.L.P.

(57) ABSTRACT

An apparatus and method are provided for processing digital imagery. A reference platform device is provided with network and telephone connectivity that enable it to establish a connection with a central server. Additional connectors are provided for attaching digital cameras and video equipment to the reference platform. The user can connect their camera to the reference platform and, by simply pressing a single button, initiate a new connection to the central server and upload the electronic image files. Once uploaded, the user can edit the image files using a standard web browser and have the processed images reduced to paper or compact disk and forwarded to another location for pick up or mailing.

45 Claims, 4 Drawing Sheets

CONSUMER LEVEL DEVICE FOR AUTOMATICALLY TRANSFERRING DIGITAL IMAGES TO AN INTERNET-BASED SERVICE PROVIDER

CROSS REFERENCE TO RELATED APPLICATION

This application claims priority to U.S. application Ser. No. 09/751,319, filed Dec. 29, 2000, entitled "Consumer Level Device for Automatically Transferring Digital Images to an Internet-Based Service Provider."

TECHNICAL FIELD OF THE INVENTION

This invention relates in general to the field of processing digital images, and more particularly to a system and method for developing images taken by digital cameras, processing those images, and then distributing them on a pre-defined media to pre-defined locations.

BACKGROUND OF THE INVENTION

In the consumer industry, the use of digital cameras is quickly growing as digital cameras are becoming more readily available to consumers. Under the current trend, it is projected that digital cameras may eventually replace conventional film-based cameras. However, the popularity of digital cameras is hampered by the fact that end users must endure a cumbersome process for converting digital pictures into a printed or web-based form. The complexity of the existing process stems from its requirement of end users to follow several steps:

1. Remove a storage media containing image data from the camera (or to connect a transfer cable as appropriate).
2. Download the images to the end user's personal computer (either via an adapter device or through a serial link) using software provided by the camera manufacturer.
3. Optionally manipulate the images on the user's computer to color correct or rotate as appropriate using software that is bundled with the camera or is produced separately.
4. Print the images on the user's printer using software provided by the camera manufacturer, by the printer manufacturer, or by a third-party.
5. Monitor the printer as the pages are printed.
6. Crop the printed pages as appropriate.
7. Manage the collection of images on the user's computer for archival and reprint purposes.
8. Delete pictures from the camera storage device in order to make space available for more pictures.

A disadvantage of the current process relates to the time end users must spend to convert digital images to a printed or web-based form. Although digital cameras give end users more control over what they shoot and print, the cumbersome process requires a series of time-consuming steps as demonstrated above.

Another disadvantage of the current process relates to managing the storage space for the pictures. Currently, end users must manually manage the storage space available on the storage media. Old image data must be manually deleted or stored in peripheral storage media in order to make space for new data. The current management of storage space is cumbersome, time-consuming, and costly.

Another disadvantage of the current process relates to the extent of end user interaction. The current process requires that the user be actively involved in each step.

Another disadvantage of the current process relates to the need for a personal computer. The current process requires the use of a personal computer, which costs significantly more than a digital camera.

There is, therefore, a need in the art for a consumer image processing device and method having fewer steps, easier steps, and increased functionality.

SUMMARY OF THE INVENTION

In accordance with the present invention, the disadvantages and problems associated with processing digital images have been substantially reduced or eliminated. In particular, the present invention is a consumer-level device that requires a significantly reduced level of user interaction and training in order to perform the steps necessary to process digital images.

In one embodiment of the present invention, the invention involves a device called a reference platform. The reference platform is comprised of a processor and a data storage media that are connected to several interfaces. The device has a camera interface that connects to devices through which digital images from a camera are transferred to the device. Examples of compatible camera interfaces include, but are not limited to, a Compact Flash, Smart Media, universal serial bus (USB), BlueTooth, Sony Memory Stick, floppy disk, compact disk, zip disk, and other compatible interfaces.

Other interfaces of the reference platform device include an RJ11 phone jack and an Ethernet port. The device automatically determines if it has access to a high speed network connection and utilizes that capability to access an upload service. In the absence of a high speed network connection, the device has the ability to rely on a dialup connection via an internal modem connected to the user's telephone jack.

An advantage of the present invention is that, after being connected to a service provider, the device does not require additional user interfaces. All functions are controlled via configuration scripts that are downloaded from the service provider. While a variety of scripting languages are useable with the present invention, XML (extensible mark-up language) is particularly adept for this application. The device has the ability to locate a service provider through a series of default setup steps. Once setup is completed, the device is ready for operation.

In operation, the user plugs her camera or memory card into the reference platform device of the present invention and presses a single button on the device to activate it. The device then connects to the server designated in the configuration script and uploads the images in the camera. The user then has an opportunity to edit the uploaded images using a standard web browser. Any edits are saved and the images are reformatted and rendered onto paper, to a designated website, or burned onto a CD-ROM or other suitable media. The paper images or CD can then be mailed to the user or picked up at the local retail outlet.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

In accordance with the present invention, the disadvantages and problems associated with processing digital images have been substantially reduced or eliminated. In particular, the present invention is a consumer-level device that requires a significantly reduced level of user interaction and training in order to perform the steps necessary to process digital images.

In one embodiment of the invention, the invention involves a device called a reference platform. The reference platform is comprised of a processor and a data storage media that are connected to several interfaces. The device has a camera interface that connects to devices through which digital images from a camera are transferred to the device. Examples of compatible camera interfaces include, but is not limited to, a Compact Flash, Smart Media, universal serial bus (USB), BlueTooth, Sony Memory Stick, floppy disk, compact disk, zip disk, and any other compatible interfaces.

Other interfaces of the reference platform device include an RJ11 phone jack and an Ethernet port. The device can optionally automatically determine if it has access to a high speed network connection and utilizes that capability to access an upload service. In the absence of a high speed network connection, the device has the ability to rely on a dialup connection via an internal modem connected to the user's telephone jack to establish a connection with the service provider's network.

An advantage of the present invention is that, after being connected to a service provider, the device does not require additional user interfaces. All functions are controlled via the configuration script that is downloaded from the service provider. While a variety of scripting languages are useable with the present invention, XML (extensible mark-up language) is particularly adept for this application. The device has the ability to locate a service provider through a series of default setup steps.

Configuration scripts contain information specifying, among other things, network behavior, including, for example, IP networking characteristics (such as IP address, net mask, and default gateway; default phone numbers(s) to dial; dialup and network logon information; passwords and usernames necessary to log on to the service; time for the device to dial or not to dial; behavior for processing or images from the media (such as to delete or not delete the image); and locations to download new software for the device.

The setup method for the reference platform device works by having a target telephone number (stored in a non-volatile memory) for establishing a PPP (point-to-point protocol) connection or an IP configuration, defaulting to using DHCP (dynamic host configuration protocol), for connecting to a specified service provider. Once the device is connected to the service provider, it will download a new configuration file (or another well-defined file format) specific to the device, which can optionally override any previous configuration value, including changing the IP configuration and telephone number to dial. In the event of a complete failure to locate a networking connection after a change, the device can be programmed to revert back to its default configuration and attempt again to make a connection.

In an embodiment of the present invention, a general purpose input/output with two LEDs and a pushbutton is used. Until the device has successfully connected to the service provider and downloaded configuration data, one of the LEDs is activated to indicate the device's state. The pushbutton is used to activate initialization of the device.

In an alternate embodiment, the device may be configured to exist on a local network that does not support DHCP, which then allow a user to specify a network behavior for the device at the service provider and to encode configuration information to the device when the device is next connected to the service provider. Through the use of these configuration preferences, many configuration possibilities become available. In one embodiment, the device may be targeted initially to any service provider by loading such information before sending the device to the consumer. Later, the device may be reconfigured at the consumer site for a new service provider (or a change in the service provider access information) by downloading a new configuration file. Through the use of configuration preferences, the device may be locked to a single service provider to ensure a steady relationship with the consumer with or without a range of options.

The device may be configured to provide appropriate security. In order to prevent another user from fraudulently submitting pictures or accessing the configuration for another device, the protocol for validating the connection involves certifying the device's serial number with either a public key encryption or another secure connection mechanism. This precaution prevents a user from submitting pictures on another person's account.

In a preferred embodiment, configuring the device involves the user contacting the service provider (via, e.g., the Internet or telephone) to establish an account. In establishing an account, the user provides certain information, for example, the serial number of the device; the user's identity; the method of payment for services; default preferences for prints; custom network configuration information for the device; and the times when the device is scheduled to dialup. The service provider associates the user and preferences with the specific device and targets all of the uploads from that device to user. If the user attempts to ask the device to upload pictures before an account has been established, the device will not upload the pictures. Once the account has been established, the device can connect to the service provider and download the configuration file. The configuration file can be stored as a simple XML script or another well-defined file format. Once the configuration file has been downloaded, the device of the present invention is ready for use.

One of the user preferences settings allows the user to choose when the device will call the service provider. The ability to schedule dialup times is desirable when the consumer prefers to wait, for example, until the middle of the night to tie up the phone line for several hours uploading pictures instead of tying up the phone line during the day.

Image files are transferred between the imaging device (e.g., a camera) and the service provider via the reference platform device of the present invention. A file transfer mechanism, such as a secure HTTP (hyper text transfer protocol) GET/PUT operation or a FTP (file transfer protocol) or other mechanism are used for the transfer.

The device can download all of its device access software from the service provider, allowing it to be configured and upgraded as needed to support any camera that connects to the physical interfaces supported by the device.

Once the image files are uploaded from the imaging device to the service provider (via the reference platform), the files are processed. Using the imaging device, the user submits a request to the service provider in the form of a print request form. The print request form can be a script which can specify, for example, print preferences, such as the number of prints, quality of the prints, and size of the prints. As with the configuration script, the print request script can utilize XML, or any other scripting language or format.

The print request form and the images are then transferred from the imaging device to the service provider via the reference platform of the present invention. The service provider can then reformat the files (if necessary) and record the data onto a designated media, such as printed paper, compact disk, floppy disk, or web-based form. Alternatively, the image files can be forwarded to a designated location, such as another user or another company, where the files can be reformatted, manipulated, and recorded onto a designated media. Before recording the images onto a designated media, the image files may be manipulated (to color correct, rotate, crop and otherwise edit as appropriate) by the user via a standard web browser and the Internet. The processed images can be mailed or transmitted to the user or can be made available for pick up.

Figure 8:
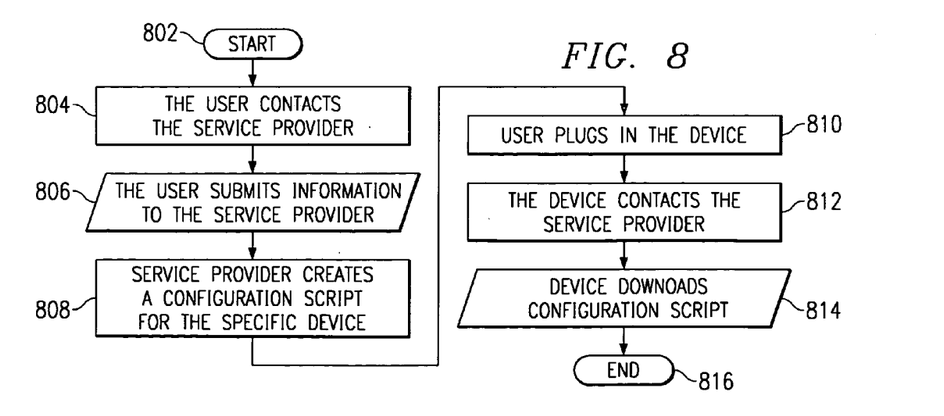
FIG. 8 is a flow chart of a preferred embodiment of the configuration method of the present invention.

The methods discussed above are illustrated in the flowcharts of FIGS. 8 and 9. Referring to the configuration method of FIG. 8, the method starts at step 802. First, the user contacts the service provider in step 804. Contact can be established by telephone, mail, e-mail, Internet web site, or other suitable mediums. In step 806, the user submits information that is requested or required by the service provider to perform the service, such as name, address, billing method, default printing instructions, delivery instructions, custom network information, dialing time periods, etc. If the user's request for an account is accepted, the service provider then creates a user account and generates a configuration script specifically for the user's reference platform (using, for example, the reference platform's unique serial number), step 808. If the user hasn't already done so, the user then plugs the reference platform into a connection receptacle such as a telephone jack (or similar connection point) and the power cable into a wall plug, step 810. The reference platform then contacts the service provider and downloads its configuration script, step 812. The configuration process is then complete, step 814.

Figure 9:
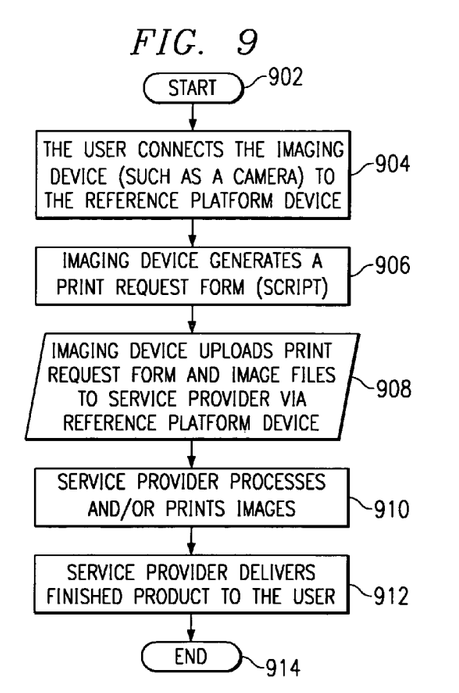
FIG. 9 is a flow chart of a preferred embodiment of the operation method of the present invention.

Operation of the reference platform of the present invention is illustrated in FIG. 9. Referring to FIG. 9, the method starts at step 902. First, the user connects their imaging device (such as a camera or camcorder) to the reference platform of the present invention, step 904. The user then generates a print request form (script) with the imaging device, step 906. The print request form can be used to designate the specific files to be processed and/or printed, as well as specify the sizes, styles, payment and delivery method for the requested images. The user then commands the imaging device to upload the print request form and user-designated image files to the service provider via the reference platform of the present invention, step 908. In some cases, for example where the imaging device does not have a user interface such as when a memory card is plugged into the reference platform, the mere connecting of the memory card (or similar device) into the reference platform will automatically initiate an upload of the image files contained within the image device or memory card along with the reference platform's configuration script to the service provider without any other user action. In this case, a print request form is not used and the pre-defined printing and delivery instructions contained within the reference platform's configuration script are used to indicate how the image files are to be processed/printed/rendered and how they are to be delivered to the user.

Again referring to FIG. 9, once the files have been uploaded to the service provider, the service provider can then process and/or print the images according to the print request form or, if no print request form is specified, then by the default instructions specified in the device's configuration file that is also uploaded with the image files, step 910. Once processed, the rendered images are delivered to the user, step 912, and the method ends, step 914.

An advantage of this invention is that it eliminates many of the steps that a user would otherwise perform in order to obtain printed or web-based pictures. Because of the use of a dynamic configuration, the device can be maintained and supported by the service provider, which further eliminates the need for consumer level user input.

In an alternate embodiment, the present invention may be built into a digital camera and thus will not require an external device. The present invention allows connection of digital cameras to the internet without the need for a personal computer.

Another benefit of the present invention relates to offering print services for digital photographs with no need for a personal computer. With digital cameras becoming widely available at lower costs, it is beneficial to have the ability to provide printed pictures without having to incur additional expenses related to a personal computer.

In accordance with another embodiment of the present invention, the device may transform the images to a different format that may be more desirable for the service provider or may apply any other image correction as desired by the service provider.

Figure 1:
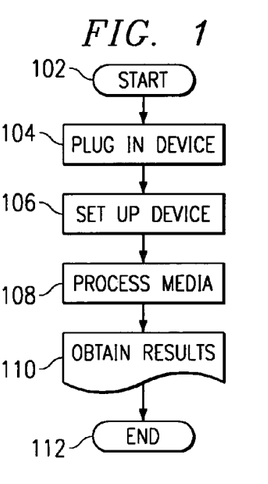
FIG. 1 is a flowchart of a method of an embodiment of the present invention to transfer digital images to an internet-based service provider.

FIG. 1 is a flowchart of a method of transferring digital images to an internet-based service provider. As illustrated in FIG. 1, the process begins at step 102. First, in step 104, the user plugs in the device to establish a server connection. Next, in step 106, the device is configured. This step is further illustrated in FIG. 2. Next, in step 108, the media is processed. This step is further illustrated in FIG. 3. In step 110, the desired results are obtained and the method ends in step 112. The procedure to obtain results, step 110, provides the user with an ability to choose into which media the resulting images are to be rendered. For example, the user may choose to have the pictures developed into prints at a nearby photo processing center that can be picked up or mailed to the user. Alternatively, the user may choose to have the pictures made available in web-based form at a specific site on the Internet. The user may also choose to have the processed images sent back to the user's device to be printed on the user's printer.

Figure 2:
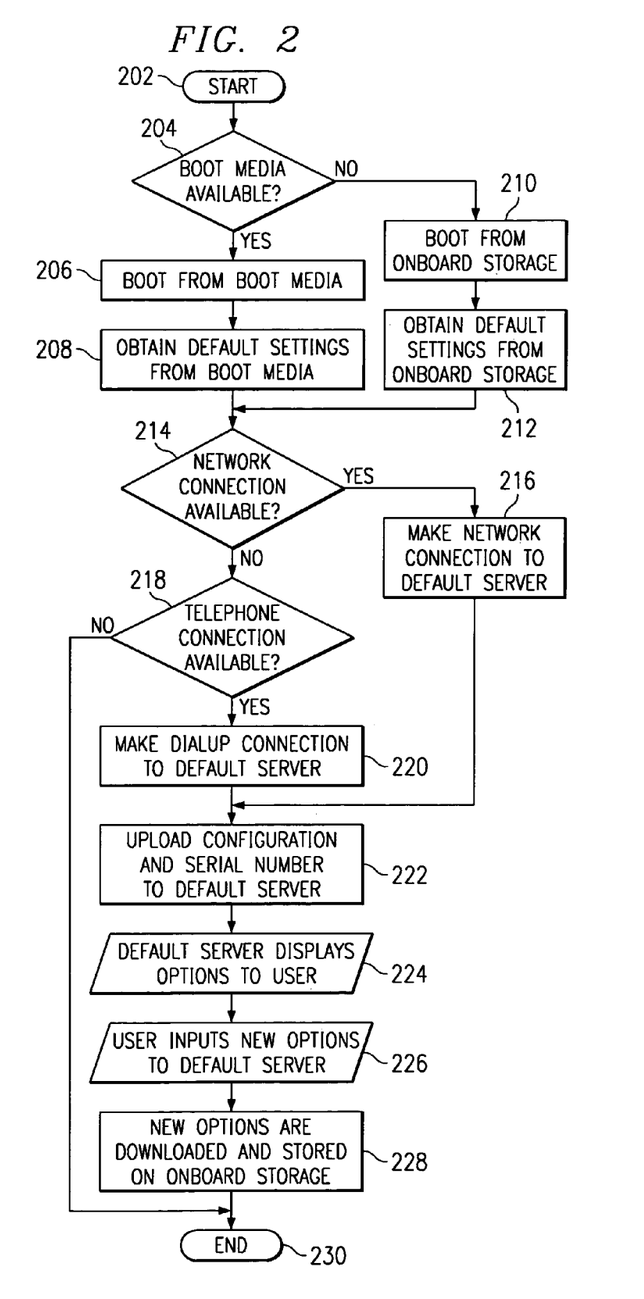
FIG. 2 is a flowchart of an embodiment of a method of the present invention to configure the device of the present invention.

FIG. 2 is a flowchart of a method of setting up the device. As illustrated in FIG. 2, the process begins at step 202. Next, in step 204, a decision is made whether boot media is available. If no boot media is available, then step 210 is next, wherein the device is booted from onboard storage, using non-volatile RAM, such as flash memory and EEPROM chips. Next, in step 212, default settings are loaded from the onboard storage to the device's microprocessor.

However, in step 204, if boot media is available, then step 206 is next. In step 206, the device is booted using the boot media. Next, in step 208, default settings are loaded from the boot media to the device.

Next, in step 214, a decision is made whether there is a network connection available. If none is available, then step 218 is next. In step 218, another decision is made whether there is a telephone connection available. If none is available, then no server connection is possible and the method ends in step 230. If a telephone connection is available, then in step 220, the device makes a dialup connection to the default server.

In step 214, if a network connection is available, then the device connects to the network to connect to a default server. Next, in step 222, configuration data and optionally a serial number are uploaded to the default server. These data allow the default server to identify the particular device thereafter.

Next, in step 224, the default server displays options to the user. Options include information, such as a username and password; a method of payment; a setting to allow access; a printing preference; a printing location preference; a mailing preference; and an e-mailing preference. Next, in step 226, the user optionally inputs new configuration settings to the default server. Next in step 228, the revised settings are downloaded in the form of a configuration script and are stored on the onboard storage and the method ends in step 230.

Figure 3:
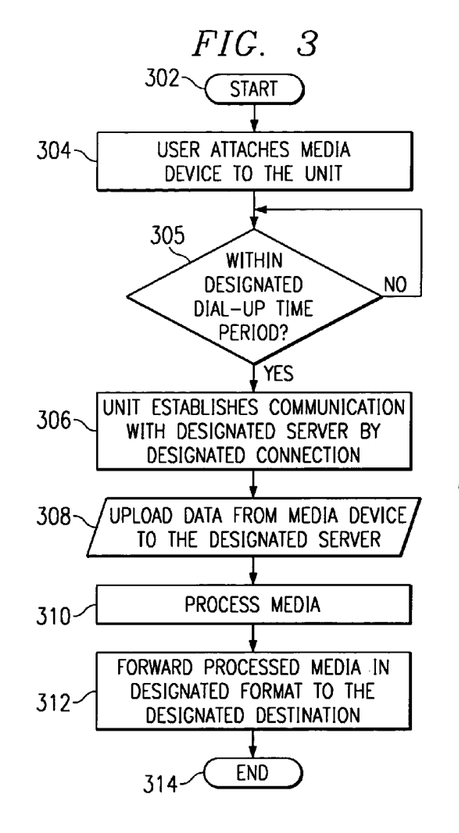
FIG. 3 is a flowchart of an embodiment of a method of the present invention to process media with the device of the present invention.

FIG. 3 shows a flowchart of a method for processing the media. The method begins at step 302. Next, in step 304, the user attaches the media component to the device. The media component may be a memory card to be inserted or a camera or other imaging device that is attached or otherwise connected to the reference platform device. In step 305, a check is made to determine whether or not the current time is within the designated upload period specified in the configuration script. If not, step 305 is repeated until the appropriate upload time is encountered. Otherwise, in step 306, the device establishes a communication link with a designated server by a designated connection. Next, in step 308, the device uploads data from the media component to the designated server. Next, in step 310, the media is processed at the designated server. Next, in step 312, the server forwards the processed media in a designated format to a designated destination and the process ends in step 314.

Figure 4:
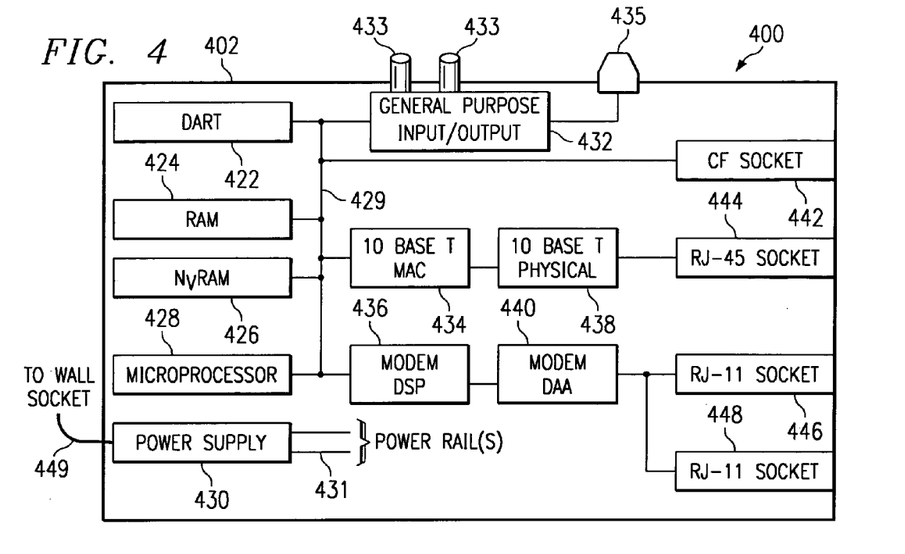
FIG. 4 is a block diagram showing internal components of an embodiment of the present invention.

FIG. 4 is a block diagram showing internal components of an embodiment of the present invention. The device 400 is encased in housing 402. Internally, DART 422 provides a universal asynchronous receiver-transmitter to handle asynchronous serial communication and is connected to bus 429. RAM 424 provides memory storage and is connected to bus 429. DRAM (dynamic random access memory) and other types of RAM including SRAM (static random access memory) can be used. NvRAM 426 provides non-volatile memory capability provides a mechanism for storing configuration information and is connected to bus 429. Microprocessor 428 is connected to bus 429. The microprocessor 428 is used to manage the various functions of the device with appropriate software that is loaded from the RAM 424, NvRAM 426, the network, or other storage media. Power supply 430 supports two rails 431 providing 5 v/3.3V to the device. In an alternative embodiment of the present invention illustrated in FIG. 4, a power supply supporting one rail at 3.3V to the device can be used in lieu of power supply 430 and power rails 431. Power cord 449 connects power supply 430 to a standard wall socket. General purpose input/output (I/O) 432 is connected to bus 429 and operates to two LEDs 433 and provides signal connection to the device for button 435. Compact flash (CF) socket 442 is connected to bus 429. 10BaseT MAC (media access control) 434 is connected between bus 429 and 10BaseT physical layer element 438, which is coupled to a standard RJ45 socket 444, to provide network communication. Although a 10BaseT system is illustrated, it should be noted that other types of Ethernet, such as Category 5 100BaseT (or Fast Ethernet that supports data transfer rates of 100 Mbps) and Gigabit Ethernet (which supports data transfer rates of 1 gigabit per second) are also useable with the present invention as well as non-Ethernet network systems. Similarly, modem DSP (digital signal processor) 436 is connected between bus 429 and modem data access arrangement (DAA) 440, which is connected to standard RJ11 sockets 446 and 448, to provide telephone communication. In an alternative embodiment of the present invention illustrated in FIG. 4, a standard modem with either a modem DAA or an analog line build out (LBO) can be used in lieu of the modem DSP 436 and modem DAA 440 to provide telephone communication.

Figure 5:
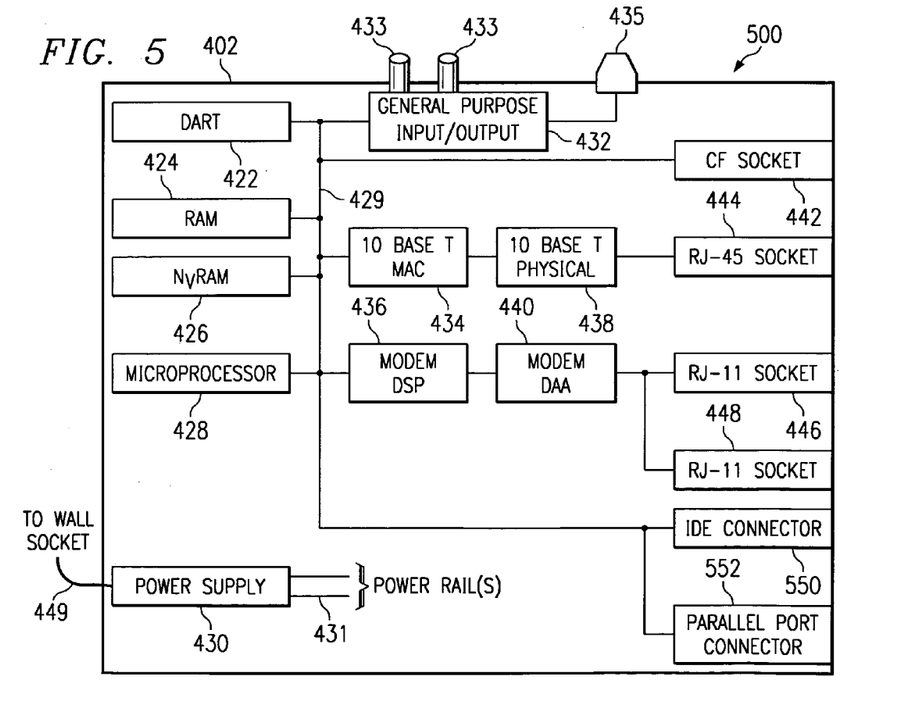
FIG. 5 is a block diagram of another embodiment of the present invention having additional connectors for connecting external devices.

FIG. 5 is a block diagram of another embodiment of the present invention. The device 500 is similar to device 400 of FIG. 4 with the addition of connectors for connecting external devices. As illustrated in FIG. 5, IDE Connector 550 and Parallel Port Connector 552 are connected to bus 429. IDE Connector 550 serves as an interface for floppy disks. Parallel Port Connector 552 serves as an interface for CD-ROMs, zip disks, or other mass storage media. Parallel Port Connector 552 can also be used to connect the device to an external printer. This embodiment is useful when the media is processed at the service provider and desired printing is designated at the user's personal printer. These additional connectors provide a much broader range of functionality to the reference platform device of the present invention.

Operation

1. User Supplied Device

Figure 6:
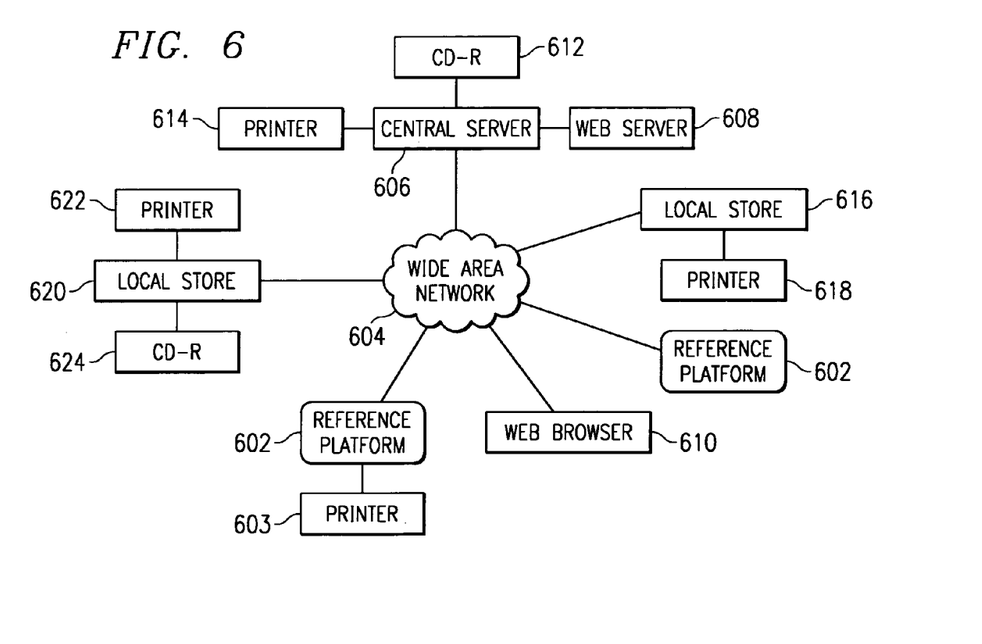
FIG. 6 is an embodiment of the method of the present invention.

In an embodiment of the method of the present invention is illustrated in FIG. 6. In this scenario, the user purchases the reference platform 602 at a retail outlet. The user then takes the device home, and plugs the power cable 449 into a standard wall socket and then plugs either a phone line into one of the RJ11 sockets 446 or 448 or a network connection into the RJ45 socket 444 (see FIG. 4). Now the reference platform 602 must be configured.

Upon plugging in, the reference platform 602 goes through a boot-up procedure as outlined above. Assuming that the device was not pre-configured, it will attempt to establish contact with the central server 606 through a network or dial-up connection via a wide area network 604 such as the Internet. Once contact with the central server is established, unique identification information is uploaded from the reference platform 602 to the central server 606. The central server 606 then establishes an account for the reference platform 602 and creates a web page (either statically or dynamically) so that the user can log into the central server's 606 web server 608 via a standard web browser 610. The user can then direct the central server 606, via the web server 608 to configure the reference platform 602 in one of a wide variety of manners. The central server 606 then downloads the configuration file to the reference platform 602.

One of the many configurations that is possible with the present invention is for the user to designate that the central server process the images (with possible editing via web server 608 and web browser 610) and then print the results with printer 614, impress an image onto a CD with CD writer 612, or place the images on a web site that is served by web server 608 (or an alternate web server). Yet another configuration may direct that the images uploaded to the central server 606 merely be forwarded to another server at a local store 616 that performs any processing and then prints the images with printer 618. Still another configuration has the central server 606 processing the images (with any editing) and then forwarding the processed images electronically to local store 620 where the images can be printed with printer 622 or written to CD with CD writer 624 and made available for pickup or delivery as designated in the configuration file.

After the device is properly configured, the device is ready for use. First, the consumer transfers images from the camera media to the device by removing the media from the camera or connecting a transfer cable as appropriate. Next, the consumer activates the device by pressing a single button (435 of FIG. 4) to connect the device to the designated central server 606 and upload the images that are to be processed. The reference platform 602 can be configured to delete all pictures from the media and camera after each picture is uploaded. At the user's option, the user can connect to the service provider's web server 608 with a standard web browser 610 in order to view, select, edit, and reformat one or more of the uploaded images. Then, the final (selected) images are reproduced onto paper with the printers 614, 622, or 618 (as directed), to a designated web site, or burned onto a CD-ROM or other suitable media with CD writers 612 or 624. The paper images or CD can then be mailed to the user or picked up at the local retail outlet. The images can be printed at the service provider or be forwarded to another user or company to be further edited and formatted. Alternatively, the images can be transmitted back to the user to be printed on the user's printer 603 as illustrated in FIG. 6.

2. Business Supplied Device

Figure 7:
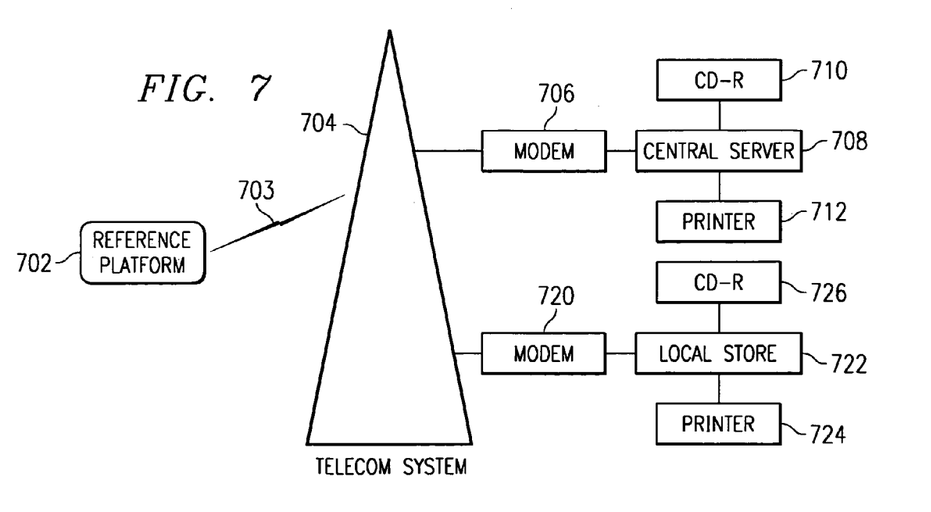
FIG. 7 is an alternate embodiment of the method of the present invention.

An alternate embodiment of a method of the present invention is illustrated in FIG. 7. In this scenario, the reference platform device 702 of the present invention is made available, either for free or at a low cost, to consumer through a local retail outlet store 722. It is envisioned that such a retail outlet store 722 can be a local drug store, where photo processing commonly occurs although other outlet stores are easily conceivable. In this scenario, the store provides the reference platform pre-configured, with most, if not all of the settings directed to the store's web server and photo process server. Moreover, the pre-configured settings may also direct that any photos uploaded from the device are sent to same store that provided the reference platform—thereby enabling the store to recoup its investment by charging the customer for processed images, CD's, etc. For individual user preferences, the store can provide a computing device, such as a personal computer, that can accept pre-approved user preferences and loads the configuration file into the reference platform accordingly. Once so configured, the reference platform needs no further configuration and is ready to use. All the user need do is take the device home, and plug the power cable 449 into a standard wall socket and plug either a phone line into one of the RJ11 sockets 446 or 448 or a network connection into the RJ45 socket 444 (see FIG. 4).

When the user has taken one or more photos that they wish to have processed, she plugs her camera's memory into one of the connectors provided on the reference platform that is compatible with her imaging device (see FIGS. 4 and 5). Once attached, she need only push the button 435 to activate the device and have the images uploaded to the central server 708. In an alternate embodiment, the reference platform device is able to detect media insertion (such as a memory card) or camera connection and automatically activate at that time or a later scheduled time without requiring the button to be pressed.

Upon initiation by the user, the reference platform 702 initiates a telephone connection through a telephone link 703. This telephone link is typically a common land line, although it could be a cellular link the allows the user to upload image files without tying up her (single) telephone line for long periods of time. In any case, the connection is routed through the telecommunication service 704 to the dial-up modem 706 of the central server 708. The time of day to call may be specified in the configuration script. Once the dial-up connection is made, the reference platform 702 is ready to upload the one or more image files.

In this scenario, the central server is instructed (by the configuration script that was pre-loaded onto the reference platform 702) to process the uploaded images in a pre-defined manner. Note, the configuration script is uploaded before the image files are uploaded so that the central server 708 will know a priori the form and the format of the uploaded files.

The configuration script that was uploaded from the reference platform 702 may, for example, instruct the central server 708 to print paper copies of the images using the printer 712. Similarly, the central server 708 may be directed to "burn" the image files onto a CD-ROM with CD writer 710. In both cases, the paper copies or CD's can be either mailed back to the user directly.

A slight alteration to this scenario would be for the central server 708 to perform whatever image processing is required of the uploaded image files and then transmit the processed image files to a local store 722 via telecommunications system 704 and modems 706 and 720. The local store 722 can then print the images with its own printer 724 or burn the images onto a CD with its CD writer 726. Once copied to tangible media, the media can either be mailed directly to the user or a call or e-mail message can be sent telling the user that the results are available for pickup.

The present invention, therefore, is well adapted to carry out the objects and attain both the ends and advantages mentioned, as well as other benefits inherent therein. While the present invention has been depicted, described, and defined by reference to particular preferred embodiments of the invention, such references do not imply a limitation on the invention, and no such limitation is to be inferred. The invention is capable of considerable modification, alteration, alternation, and equivalents in form and/or function, as will occur to those of ordinary skill in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A device for processing digital images comprising:
a reference platform including:
    a camera interface, the camera interface operable to receive one or more digital images; and
    a communication interface coupled to the camera interface, the communication interface operable to automatically communicate said digital images to a wide area network, the communication interface operable to automatically identify an entity on the wide area network to which the communication interface sends said data images, the communication interface operable to determine whether it has access to a high speed network connection, the communication interface operable to establish a communication link over the high speed network connection with the entity in response to access thereto, the communication interface operable to establish a communication link over a dialup connection with the entity in response to no access to the high speed network connection, the communication interface operable to automatically receive configuration data from said entity over the established communication link, the configuration data operable to control communication of said digital images without any user interfacing, the reference platform being associated with a webpage established at the entity and accessible to the user.

2. The device of claim 1, wherein the reference platform comprises:
    a processor operable to execute instructions; and
    a data storage media operable to store configuration data and said digital input.

3. The device of claim 1, wherein the communication interface device is operable to communicate to a service provider.

4. The device of claim 1, wherein the communication interface is a dial up modem.

5. The device of claim 1, wherein the communication interface is to a broadband enabled network.

6. The device of claim 1, wherein the communication interface is an Ethernet network.

7. The device of claim 1, wherein the communication interface is a token ring.

8. The device of claim 1, wherein the communication interface is a FDDI (Fiber Distributed Data Interface).

9. The device of claim 1, wherein the communication interface is an ATM (Asynchronous Transfer Mode) network.

10. The device of claim 1, wherein the communication interface uses TCP/IP (Transmission Control Protocol/Internet Protocol).

11. The device of claim 1, wherein the camera interface is selected from a group consisting of Smart Media, Compact Flash, USB, BlueTooth, Sony Memory Stick, floppy disk, compact disk, and zip disk.

12. The device of claim 1, further comprising a digital camera coupled to the reference platform.

13. A method for processing digital images comprising the steps of:
    providing image data on a storage media;
    connecting the storage media to a reference platform;
    transferring the image data to the reference platform;
    determining with a communication interface whether access to a high speed network connection is available;
    establishing a communication link over the high speed network connection with a service provider in response to access being available to the high speed network connection;
    establishing a communication link over a dialup network connection with the service provider in response to access not being available to the high speed network connection;
    automatically connecting the reference platform to the service provider identified by the reference platform over the established communication link;
    establishing a webpage associated with the reference platform at the service provider in response to establishing the communication link, the webpage being accessible to the user;
    automatically receiving configuration data from the service provider; and
    automatically uploading the image data to the service provider in response to the configuration data without any user interfacing.

14. The method of claim 13, further comprising the step of editing the uploaded image data on the service provider.

15. The method of claim 13, further comprising the step of processing the image data in the storage media.

16. The method of claim 13, further comprising the step of deleting image data from the storage media after each image is uploaded.

17. The method of claim 13, further comprising the step of enabling a user to view the image via a web browser.

18. The method of claim 13, further comprising the step of enabling the service provider to print the image.

19. The method of claim 13, further comprising the step of creating a web page with the image data.

20. The method of claim 13, further comprising the step of creating a compact disk with the image data.

21. The method of claim 13, further comprising the step of directing the image data to be processed at a processing center in close proximity to the end user.

22. A method for processing digital images comprising the steps of:
    providing for a reference platform;
    establishing a standard default profile in the reference platform;
    determining with a communication interface whether access to a high speed network connection is available;
    establishing a communication link over the high speed network connection with a website in response to access being available to the high speed network connection;
    establishing a communication link over a dialup network connection with the website in response to access not being available to the high speed network connection;
    connecting the reference platform to the website over the established communication link for setting initial user profile information;
    establishing a webpage associated with the reference platform on the website, the webpage being accessible to the user; and
    downloading initial user profile information onto the reference platform from the website, the reference platform interfacing with the website without user interaction.

23. The method of claim 22, wherein establishing a standard default profile comprises:
    providing a modem; and
    setting a phone number to dial.

24. The method of claim 22, wherein user profile information is selected from a group consisting of:
a username and password;
an identification number of a device;
a method of payment;
a setting to allow access;
a printing preference;
a printing location preference;
a mailing preference; and
an e-mailing preference.

25. A method for processing digital images comprising the steps of:
providing a reference platform;
determining with a communication interface whether access to a high speed network connection is available;
establishing a communication link over the high speed network connection in response to access being available to the high speed network connection; establishing a communication link over a dialup network connection in response to access not being available to the high speed network connection;
establishing a webpage associated with the reference platform, the webpage being accessible to the user;
establishing a standard default profile in the reference platform over the established communication link; and
establishing initial user profile information on the reference platform without requiring user interface.

26. The method of claim 25, wherein user profile information is selected from a group consisting of:
a username and password;
an identification number of a device;
a method of payment;
a setting to allow access;
a printing preference;
a printing location preference;
a mailing preference; and
an e-mailing preference.

27. A method for processing digital images comprising the steps of:
providing a reference platform device from a retail outlet to a consumer;
determining with a communication interface whether access to a high speed network connection is available;
establishing a communication link over the high speed network connection with a central server in response to access being available to the high speed network connection;
establishing a communication link over a dialup network connection with the central server in response to access not being available to the high speed network connection;
connecting the device to the central server over the established communication link;
establishing a webpage associated with the reference platform at the central server, the webpage being accessible to the user; and
establishing an account with the central server;
configuring the device;
uploading images to the central server; and
directing the central server to process images, wherein the device interfaces with the central server without user interaction.

28. The method of claim 27, wherein the step of providing the reference platform device to a consumer further comprises giving the device to the consumer for free.

29. The method of claim 27, wherein the step of directing the central server to process images further comprises the step of printing the images at a printer at the central server's site.

30. The method of claim 27, wherein the step of directing the central server to process images further comprises the step of impressing the images onto a CD with a CD writer.

31. The method of claim 27, wherein the step of directing the central server to process images further comprises the step of placing the images on a web site.

32. The method of claim 27, further comprising the step of directing that the images be forwarded to a server at a local store.

33. The method of claim 32, further comprising the step of printing the images at a printer at the local store's site.

34. The method of claim 32, further comprising the step of impressing the images onto a CD with a CD writer at the local store's site.

35. The method of claim 27, further comprising the step of directing that the images be forwarded to the user.

36. The method of claim 35, further comprising the step of printing the images at a printer at the user's site.

37. The method of claim 27, further comprising the step of allowing the user to connect to central server to manipulate the images.

38. The method of claim 27, wherein the device is pre-configured with settings directed to the retail outlet's server.

39. The method of claim 27, wherein the device is pre-configured with a setting to direct that uploaded images are sent to the store that provided the device.

40. The method of claim 27, wherein the step of uploading images to the central server is determined by a user preference which specifies the time when uploading is to occur.

41. The method of claim 27, further comprising the step of mailing processed images to the consumer.

42. The method of claim 27, further comprising the step of transmitting processed images to the consumer.

43. The method of claim 27, further comprising the step of making the processed images available for the consumer to pick up.

44. A method for configuring a reference platform by a user comprising the steps of:
contacting a service provider identified by said reference platform;
submitting information to said service provider;
creating an account for said user by said service provider;
receiving image data at said reference platform;
connecting said reference platform to a communication receptacle; and
determining with a communication interface whether access to a high speed network connection is available;
establishing a communication link over the high speed network connection with the service provider in response to access being available to the high speed network connection;
establishing a communication link over a dialup network connection with the service provider in response to access not being available to the high speed network connection, contacting said service provider with said reference platform over the established communication link;

establishing a webpage associated with the reference platform at the service provider, the webpage being accessible to the user; and wherein said reference platform receives configuration script to control communication of image data from said reference platform to said service provider without user interaction.

45. A method of processing digital images comprising the steps of:

connecting an imaging device to a reference platform;

generating a print request form with said imaging device, said print request form designating at least one image file in said image device for processing;

determining with a communication interface whether access to a high speed network connection is available;

establishing a communication link over the high speed network connection in response to access being available to the high speed network connection;

establishing a communication linkover a dialup network connection in response to access not being available to the high speed network connection;

downloading a configuration script to said reference platform without user interaction over the established communication link;

uploading said print request form and said at least one image file to a service provider via said reference platform in response to said configuration script;

establishing a webpage associated with the reference platform at the service provider, the webpage being accessible to the user;

processing said at least one image file according to said print request form for generating a processed image; and delivering said processed image to a user.

* * * * *

UNITED STATES PATENT AND TRADEMARK OFFICE
CERTIFICATE OF CORRECTION

PATENT NO. : 7,196,805 B1 Page 1 of 1
APPLICATION NO. : 09/781531
DATED : March 27, 2007
INVENTOR(S) : John A. Toebes et al.

It is certified that error appears in the above-identified patent and that said Letters Patent is hereby corrected as shown below:

Title page, insert the following: --Related U.S. Application Data
(63) Continuation of application No. 09/751,319, filed on December 29, 2000, now Pat No. 7,196,805.--

Signed and Sealed this

Twenty-third Day of December, 2008

JON W. DUDAS
*Director of the United States Patent and Trademark Office*